US012617664B2

(12) United States Patent
Wantland

(10) Patent No.: US 12,617,664 B2
(45) Date of Patent: May 5, 2026

(54) COUNTERTOP APPLIANCES AND WATER SUPPLY THEREFOR

(71) Applicant: Haier US Appliance Solutions, Inc., Wilmington, DE (US)

(72) Inventor: Louis A. Wantland, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 120 days.

(21) Appl. No.: 18/613,718

(22) Filed: Mar. 22, 2024

(65) Prior Publication Data

US 2025/0296828 A1 Sep. 25, 2025

(51) Int. Cl.
*F25D 23/12* (2006.01)
*B67D 1/00* (2006.01)
*B67D 1/12* (2006.01)

(52) U.S. Cl.
CPC ......... *B67D 1/0014* (2013.01); *B67D 1/0081* (2013.01); *B67D 1/12* (2013.01); *F25D 23/126* (2013.01); *B67D 2001/1263* (2013.01)

(58) Field of Classification Search
CPC ...... F25D 23/126; F25D 23/028; F25D 23/04; F25D 23/12; F25D 2323/122; F25D 2331/81; B67D 2210/00036
USPC .................................................... 62/339, 389
See application file for complete search history.

(56) References Cited

U.S. PATENT DOCUMENTS

| | | | | |
|---|---|---|---|---|
| 5,490,547 | A * | 2/1996 | Abadi | B67D 3/0009 141/82 |
| 5,816,058 | A * | 10/1998 | Lee | C02F 1/481 62/126 |
| 6,681,585 | B1 * | 1/2004 | Stagg | F25D 23/126 62/177 |
| 8,739,568 | B2 * | 6/2014 | Allard | F25D 23/12 62/448 |
| 8,756,950 | B2 | 6/2014 | Brunner et al. | |
| 9,273,894 | B1 | 3/2016 | Whitty et al. | |
| 9,809,437 | B2 | 11/2017 | Tansey, Jr. | |
| 10,519,025 | B2 * | 12/2019 | Sakthivel | F25D 23/126 |
| 10,794,628 | B2 * | 10/2020 | Park | F25D 23/126 |
| 11,199,352 | B1 | 12/2021 | DuPlessis | |
| 11,326,825 | B2 * | 5/2022 | Miller | B67D 1/0858 |
| 2005/0178273 | A1 * | 8/2005 | Meuleners | B67D 1/0858 99/279 |
| 2018/0010837 | A1 | 1/2018 | Miller et al. | |
| 2020/0182535 | A1 * | 6/2020 | Scalf | F25C 5/22 |
| 2020/0208904 | A1 * | 7/2020 | Choy | B67D 3/0003 |
| 2021/0396459 | A1 * | 12/2021 | Kwon | F25D 23/04 |
| 2025/0024987 | A1 * | 1/2025 | Hahn | A47J 31/525 |

* cited by examiner

*Primary Examiner* — Charles P. Cheyney
(74) *Attorney, Agent, or Firm* — Dority & Manning, P.A.

(57) ABSTRACT

Systems and methods for providing water to a countertop appliance, and a pitcher which may be used with such systems and methods, are provided. The pitcher may include at least one pitcher wall and an internal volume defined within the at least one wall of the pitcher. The pitcher may be configured to be received in an autofill dispenser in a refrigerator appliance. The refrigerator appliance may include a cabinet defining a fresh food chamber. The pitcher may also be configured to couple to a countertop appliance whereby the internal volume of the pitcher is in fluid communication with the countertop appliance to provide water from the internal volume of the pitcher to the countertop appliance when coupled.

8 Claims, 14 Drawing Sheets

COUNTERTOP APPLIANCES AND WATER SUPPLY THEREFOR

FIELD OF THE INVENTION

The present subject matter relates generally to domestic appliances, and more particularly to water reservoir systems for such appliances.

BACKGROUND OF THE INVENTION

Various household appliances or domestic appliances use water to perform a range of tasks, such as making ice, brewing coffee, and other similar tasks. Some such domestic appliances are not provided with a plumbing connection, or may include a self-contained water supply, e.g., a water tank or water reservoir, for various reasons. Such unplumbed domestic appliances are typically sized to be conveniently located at any spot of the user's choosing, such as on a kitchen countertop, and thus may be referred to as countertop appliances. For example, a coffee maker or a stand-alone ice making appliance may include a water reservoir. Users frequently add tap water to the water reservoir of such appliances. Tap water may be less than optimal for some applications. For example, tap water may include various impurities that negatively affect the appearance and/or taste of coffee brewed from the tap water or ice cubes formed from the tap water. As another example, ice may be more readily formed in an ice maker when the water is chilled prior to being supplied to the ice maker.

Some refrigerator appliances include autofill dispensing systems. Autofill dispensing systems typically include a dispenser housing and a pitcher. When the pitcher is positioned in a designated spot, e.g., within the autofill housing, water is automatically dispensed into the pitcher to a predetermined volume. When chilled water is desired, the pitcher is removed from the refrigerator appliance and the desired amount of liquid is manually dispensed, typically by tilting the pitcher to pour the water from the pitcher. When the pitcher is returned to the dispenser housing, it is automatically refilled to the predetermined volume of water. Thus, a supply of chilled water is maintained.

Some users may desire to fill the water reservoir of a water-using domestic appliance from the pitcher of the autofill dispensing system. Doing so may, however, be cumbersome, inconvenient, or messy. For example, a filled pitcher may be too heavy for a user to manipulate safely and/or accurately. As another example, dispensing water from a spigot of the pitcher into the water reservoir of the water-using domestic appliance may involve removing the water reservoir from the water-using appliance, then holding the water reservoir with one hand while operating the spigot the other.

Accordingly, improved systems and methods for providing water to a countertop appliance are desired in the art.

BRIEF DESCRIPTION OF THE INVENTION

Aspects and advantages of the invention will be set forth in part in the following description, may be apparent from the description, or may be learned through practice of the invention.

In one exemplary aspect, a method of providing water to a countertop appliance is provided. The method includes receiving a pitcher in an autofill dispenser in a refrigerator appliance. The pitcher includes at least one pitcher wall and an internal volume defined within the at least one pitcher wall of the pitcher. The refrigerator appliance includes a cabinet defining a fresh food chamber. The method further includes flowing a volume of water into the internal volume of the pitcher from the autofill dispenser in the refrigerator appliance. The method also includes coupling the pitcher to the countertop appliance. As a result of such coupling, the internal volume of the pitcher is in fluid communication with the countertop appliance. The method further includes providing the volume of water from the internal volume of the pitcher to the countertop appliance when coupled.

In another example aspect, a system for providing water to a countertop appliance is provided. The system includes a refrigerator appliance, the countertop appliance, and a pitcher. The refrigerator appliance includes a cabinet defining a fresh food chamber and an autofill dispenser. The pitcher includes at least one pitcher wall and an internal volume defined within the at least one wall of the pitcher. The pitcher is configured to couple to the countertop appliance. As a result of such coupling, the internal volume of the pitcher is in fluid communication with the countertop appliance to provide water from the internal volume of the pitcher to the countertop appliance when coupled.

In another exemplary aspect, a pitcher is provided. The pitcher includes at least one pitcher wall and an internal volume defined within the at least one wall of the pitcher. The pitcher is configured to be received in an autofill dispenser in a refrigerator appliance. The refrigerator appliance includes a cabinet defining a fresh food chamber. The pitcher is configured to couple to a countertop appliance. As a result of such coupling, the internal volume of the pitcher is in fluid communication with the countertop appliance to provide water from the internal volume of the pitcher to the countertop appliance when coupled.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
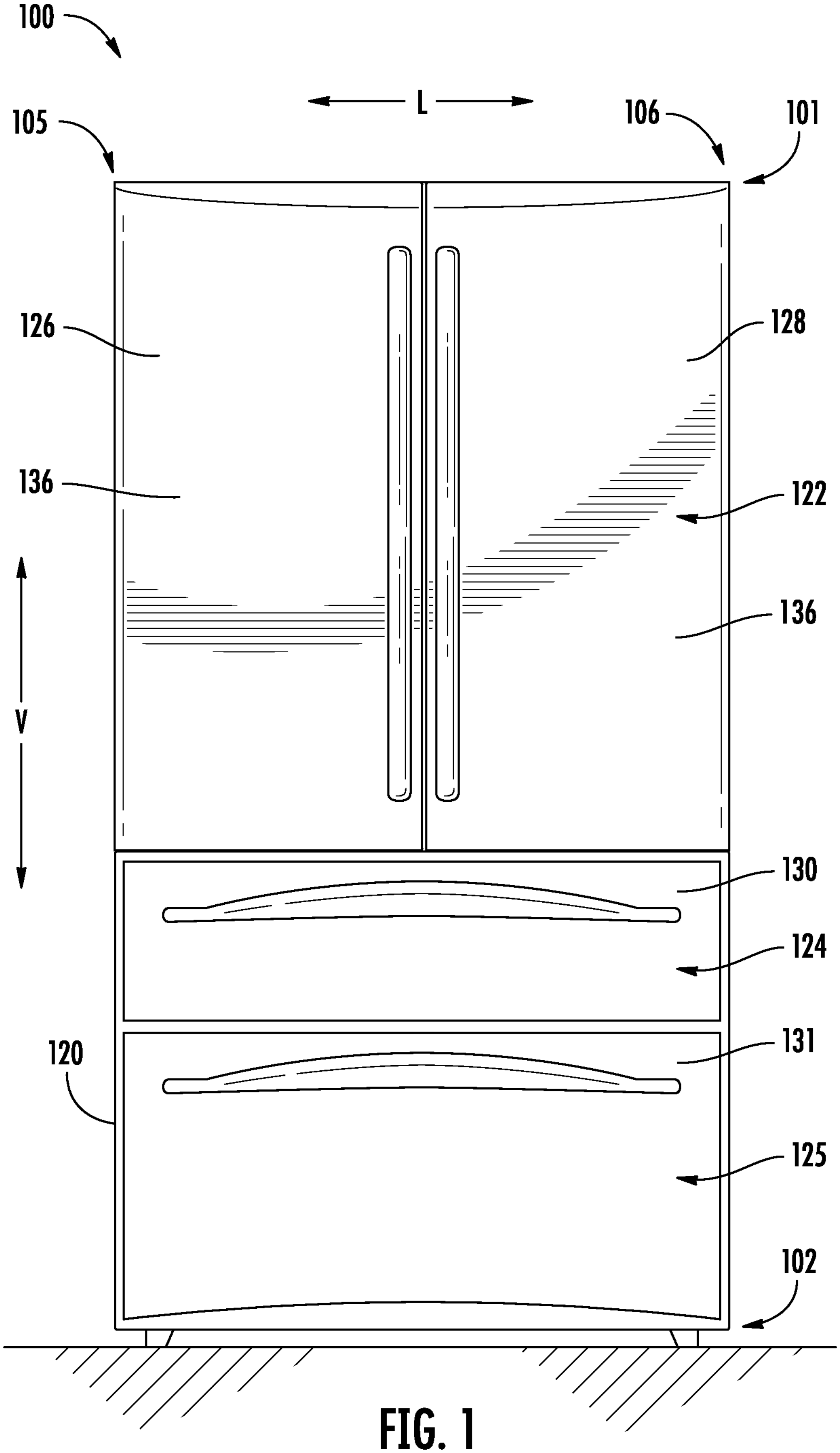
FIG. 1 provides a front view of a refrigerator appliance according to one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
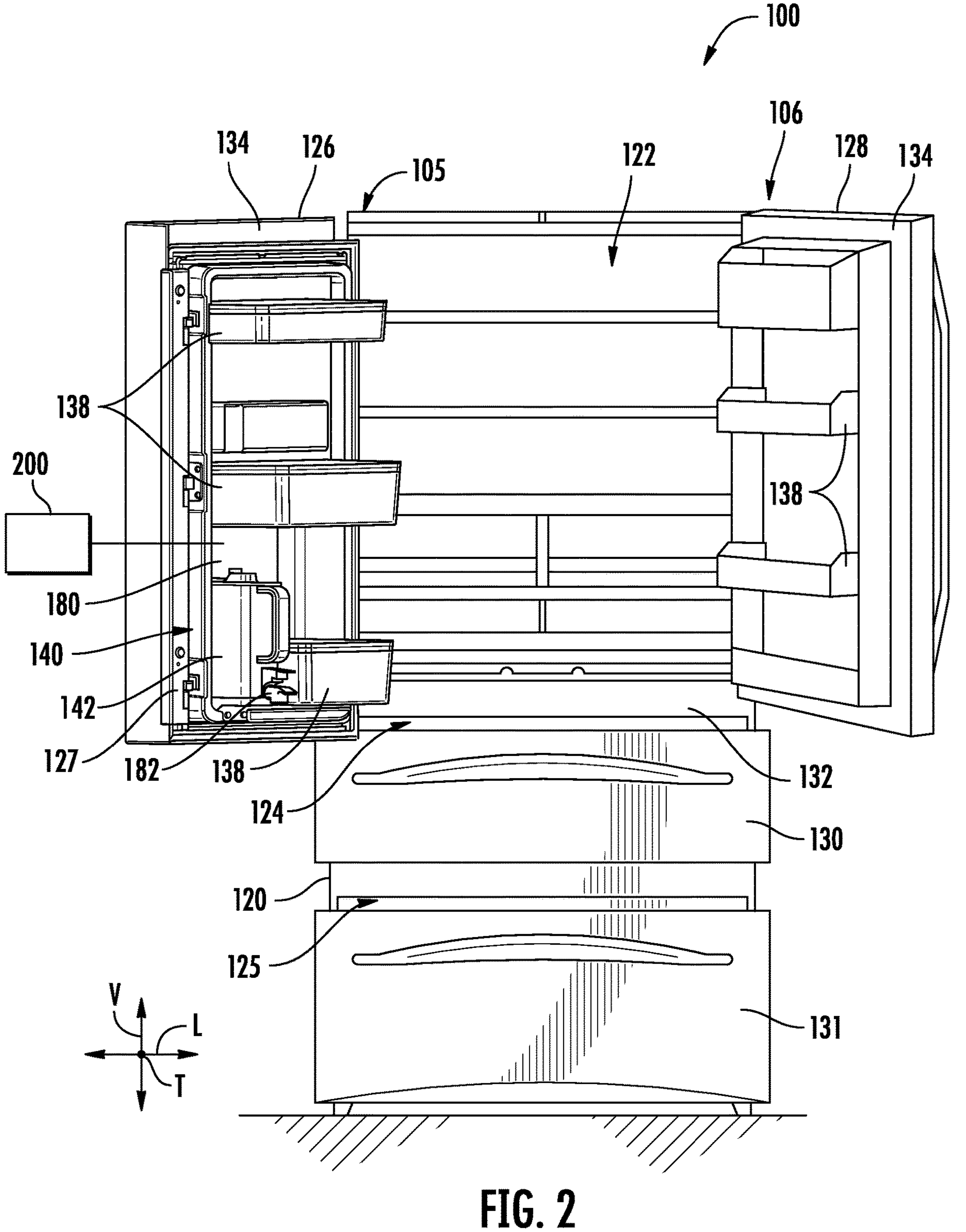
FIG. 2 provides a front view of the refrigerator appliance of FIG. 1 with refrigerator and freezer compartment doors shown in an open configuration.

Turning to the figures, FIG. 1 provides a front view of an exemplary refrigerator appliance 100 according to an exemplary embodiment of the present disclosure. FIG. 2 provides a front perspective view of refrigerator appliance 100 showing refrigerator doors 126, 128 in an open position to reveal the interior of fresh food chamber 122. Refrigerator appliance 100 extends between a top 101 and a bottom 102 along a vertical direction V, between a left side 105 and a right side 106 along a lateral direction L, and extends between a front and a back along a transverse direction T, which is a direction orthogonal to the vertical direction V and the lateral direction L. Vertical direction V, lateral direction L, and transverse direction T are mutually perpendicular and form an orthogonal direction system for the refrigerator appliance 100.

Refrigerator appliance 100 includes a housing or cabinet 120 defining one or more chilled chambers therein. For example, in the illustrated embodiment the chilled chambers include a fresh food chamber 122, a first freezer chamber 124, and a second freezer chamber 125. The freezer chambers 124 and 125 may both be arranged below fresh food chamber 122 along the vertical direction V. In this configuration, refrigerator appliance 100 may generally be referred to as a bottom mount, or bottom freezer, refrigerator. In additional embodiments, the middle chamber may be a flexible chamber in place of first freezer chamber 124 and may be selectively operable at various temperatures for storing any desired food items, such as produce, wine, etc. As illustrated, fresh food chamber 122 is bounded by vertical walls at the left side 105 and at the right side 106, such walls spaced apart in the lateral direction L, a horizontal wall near the top 101 (FIG. 1) of the refrigerator appliance, and at the bottom of the fresh food chamber 122 by a lower wall 132. Cabinet 120 also defines a mechanical compartment (not shown) for receipt of a sealed cooling system (not shown).

Left and right refrigerator doors 126, 128, respectively, are rotatably hinged to an edge of cabinet 120 at left 105 and right 106 sides, respectively, for accessing fresh food chamber 122 (FIG. 2) or sealing fresh food chamber 122 as illustrated in FIG. 1. For example, upper and lower hinges (not shown) may couple each door 126, 128 to cabinet 120. When left and right doors 126, 128 are configured as illustrated in FIGS. 1 and 2, the door arrangement is sometimes referred to as a "French door" configuration. In other embodiments, one door may be used, rotatably hinged to one edge of cabinet 120 at one side (i.e., 105 or 106) for selectively opening or sealing fresh food chamber 122. Freezer doors, such as a first freezer door 130 and a second freezer door 131, may be arranged below refrigerator doors 126, 128 for accessing one or more freezer chambers, such as first and second freezer chambers 124, 125, respectively. In the exemplary embodiment shown in FIG. 1, freezer doors 130, 131 are coupled to freezer drawers (not shown) slidably coupled within first and second freezer chambers 124, 125. Such drawers are thus generally "pull-out" drawers in that they can be manually moved into and out of freezer chambers 124, 125 on suitable slide mechanisms. Each door 126, 128, 130, 131 can include a handle for accessing one of the chambers 122, 124, 125 of refrigerator appliance 100.

Left door 126 of refrigerator appliance 100 includes an inner surface 134 (FIG. 2) and an outer surface 136 (FIG. 1). Inner surface 134 generally defines a portion of the interior of fresh food chamber 122 when door 126 is in a closed position as shown in FIG. 1. Outer surface 136 is generally opposite inner surface 134 and defines a portion of the exterior of refrigerator appliance 100 when door 126 is in the closed position. The same construction may result in a similarly formed right door 128 as left door 126 with inner surface 134 and outer surface 136. Moreover, it will further be appreciated that freezer doors 130, 131 can likewise include inner and outer surfaces 134 and 136.

Doors 126, 128 may include storage bins or shelves 138 movably or fixedly attached to the inner surface 134 of the doors 126, 128. In the embodiment illustrated in FIG. 2, left door 126 includes an autofill pitcher system 140 in accordance with this disclosure. The autofill pitcher system 140 is illustrated as a component of, or mounted to, the left door 126 for convenience. In other embodiments, the autofill pitcher system 140 may be mounted in a different position on the left door 126, or on the right door 128, or may be mounted elsewhere within the fresh food chamber 122. Autofill pitcher system 140 may be enclosed within the fresh food chamber when at least one of the doors 126, 128 is in the closed position of FIG. 1. In embodiments in which the autofill pitcher system 140 is on one of the doors (126 as illustrated or 128), when the door is closed (FIG. 1) the door 126 or 128 and the autofill pitcher system 140 cooperate to seal the chamber 122 with the autofill pitcher system 140 enclosed therein. In embodiments in which the autofill pitcher system 140 is within the fresh food chamber 122, the closed doors 126, 128 enclose the autofill pitcher system 140 inside the chamber as well.

Figure 3:
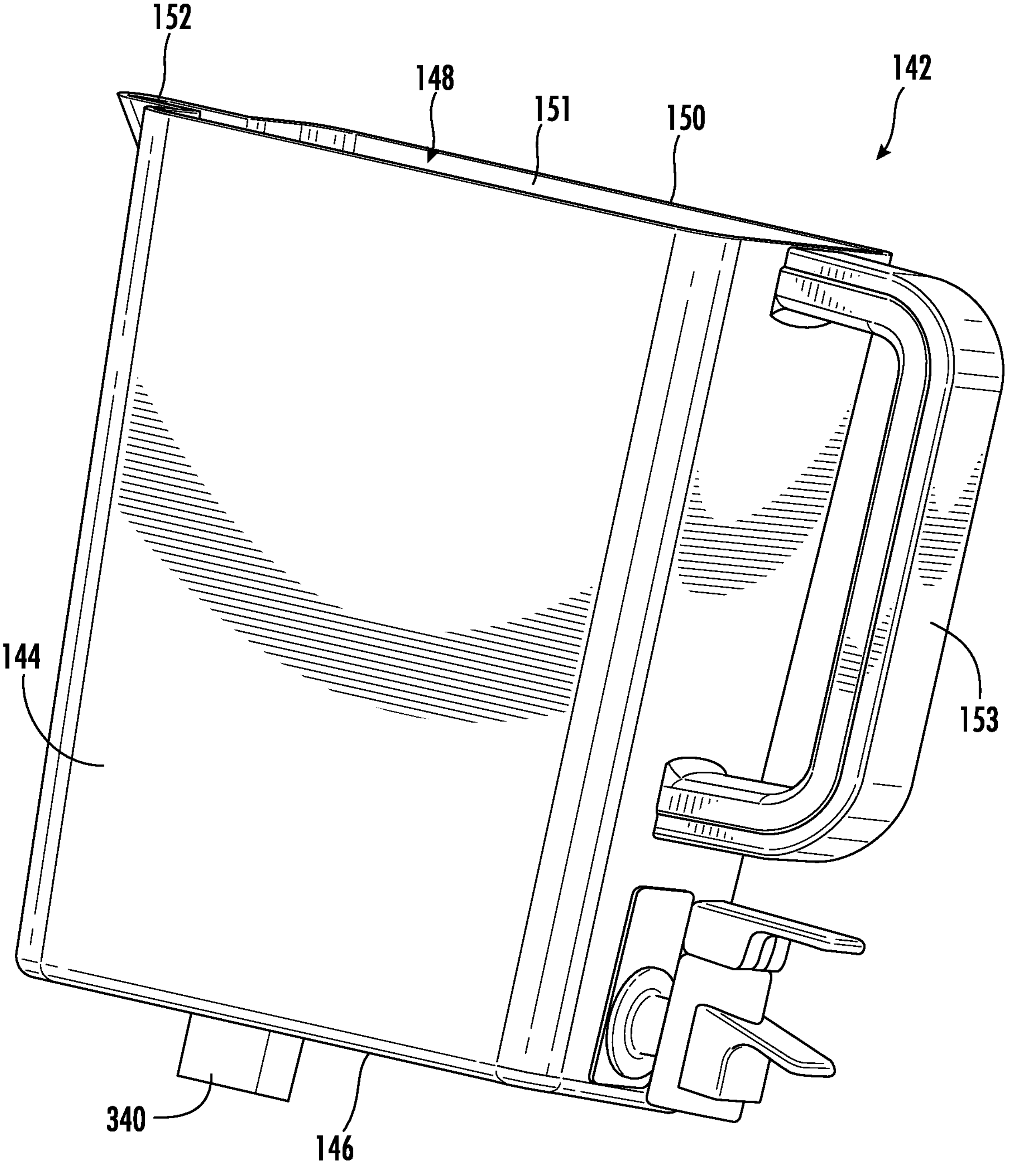
FIG. 3 provides a perspective view of a pitcher in accordance with one or more exemplary embodiments of the present disclosure.

The autofill pitcher system 140 comprises a removable pitcher, pitcher 142, a dispenser 160, and controller 200. The details of exemplary pitcher 142 may best be illustrated with reference to FIGS. 3 and 4. FIG. 3 is a perspective view of a representative pitcher 142 comprising a pitcher side wall 144 connected to, or formed with, a pitcher bottom wall 146. A top edge 150 is formed by the pitcher side wall 144 at the pitcher end opposite pitcher bottom wall 146. The pitcher side wall 144 and pitcher bottom wall 146 define a pitcher volume, internal volume 148, accessible through opening 151 defined by the top edge 150. For convenience, top edge 150 may also define a spout 152 at a first end of the pitcher to facilitate directing liquid into, or out of, the pitcher 142.

In the illustrated exemplary embodiment, the pitcher side wall 144 is a single continuous side wall which extends completely around the outermost perimeter of the pitcher bottom wall 146 and extends upward from the pitcher bottom wall 146 generally along the vertical direction V. It should be understood that references herein throughout to the orthogonal direction system including vertical direction V, lateral direction L, and transverse direction T in the context of the pitcher 142 are with reference to when the pitcher 142 is docked in the cavity 181 and, in embodiments where the autofill pitcher system 140 is provided on a door of the refrigerator appliance, the door is in the closed position. In additional embodiments, the pitcher 142 may include a plurality of side walls which collectively extend completely around the outermost perimeter of the pitcher bottom wall 146 and thereby define the internal volume of the pitcher 142, e.g., pitcher volume 148 may be enclosed on four sides (such as front, back, left, and right) by one or more side walls and on a fifth side (e.g., bottom) by the pitcher bottom wall 146, and the pitcher volume 148 may be open on the sixth side, e.g., at the top.

At a second end of the pitcher, opposite the spout 152, a handle 153 may be disposed or formed on pitcher side wall 144 to provide a gripping area to aid in manipulating the pitcher 142. Pitcher 142 may include a tap or spigot 182 (disclosed more fully below) disposed on a portion of the pitcher side wall 144 and in selectable fluid communication with volume 148. That is, the spigot 182 may be manually selectable between a position that allows fluid communication or blocks fluid communication with the pitcher volume 148. As illustrated, spigot 182 is beneath the handle 153 and provided to dispense a liquid, typically chilled water, from the pitcher volume 148. In other embodiments, the spigot 182 may be located or disposed on other portions of the pitcher side wall 144.

A check valve 340 may be provided in and through the pitcher bottom wall 146. The check valve 340 may extend downward from the bottom wall 146 away from the internal volume 148 of the pitcher 142. The check valve 340 may be located at or approximately at a geometric center of the pitcher bottom wall 146, where "approximately at the geometric center" includes offset from the exact geometric center by up to 10% of a respective dimension of the bottom wall 146 along any one or more directions, e.g., by up to 10% of a width of the bottom wall 146 towards the front or back of the pitcher 142 from the exact geometric center of the bottom wall 146. As will be discussed further below, the pitcher 142 may be configured to couple to a countertop appliance by coupling the pitcher 142 to the countertop appliance at the check valve 340 of the pitcher 142, to thereby place the internal volume 148 of the pitcher 142 in fluid communication with the countertop appliance through the check valve 340.

Exemplary pitcher 142 is illustrated as a generally hollow rectangular cuboid for ease of illustration only. Other embodiments may have other shapes, for example a hollow cylinder, and may or may not have features such as a spout or a handle.

Figure 4:
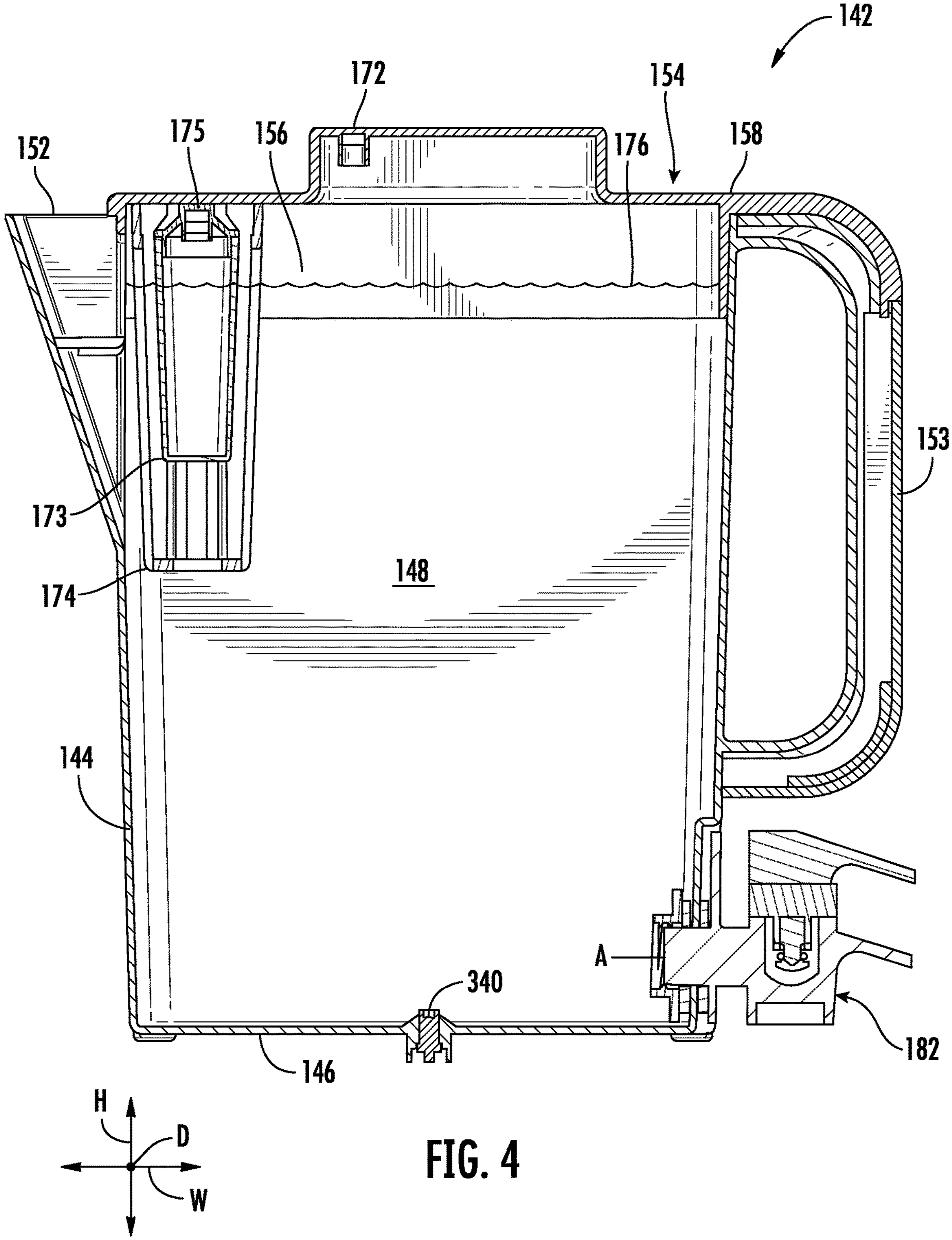
FIG. 4 provides a side sectional view of a pitcher and lid in accordance with one or more exemplary embodiments of the present disclosure.

An orthogonal coordinate system for the embodiment of water pitcher 142 is defined in FIG. 4. The height H is generally parallel to the vertical direction V used in reference to the refrigerator appliance 100 in FIGS. 1 and 2 (e.g., when the pitcher 142 is docked with the dispenser 160 on one of the refrigerator doors). Width W extends perpendicular to the height H from the spout end (e.g., front) to the handle end (e.g., back) of the pitcher 142. The depth D is perpendicular to the H-W plane.

As illustrated in FIG. 4, embodiments of pitcher 142 may include a lid 154 removably received in the opening 151 at the top edge 150. The lid 154 may include a peripheral skirt 156 configured to be removably received in the opening 151 of pitcher 142. Some embodiments of the skirt 156 may include features (not shown) that engage an inner portion of pitcher side wall 144 at the top edge 150 to secure the lid against accidental separation from the pitcher 142.

Lid 154 includes first magnet 172 adjacent to the top wall 158 of lid 154. First magnet 172 may communicate with components of the dispenser 160 to indicate that the pitcher 142 is properly located in the dispenser 160. The lid 154 may also include a pitcher full sensor to communicate to the dispenser 160 that the volume 148 is filled to a predetermined level. In the exemplary embodiment of the FIG. 4, a float body 173 is constrained within channel 174 for vertical displacement (in the H direction) proportionally with the level of fluid in the pitcher 142. As illustrated in FIG. 4, float body 173 includes second magnet 175 at the vertically upper end of the float body 173. When the water level 176 in the pitcher 142 corresponds with a predetermined full level (as in FIG. 4), second magnet 175 is proximate to the top wall 158 and may communicate with components of the dispenser 160 to indicate that the pitcher 142 is in a full condition.

Figure 5:
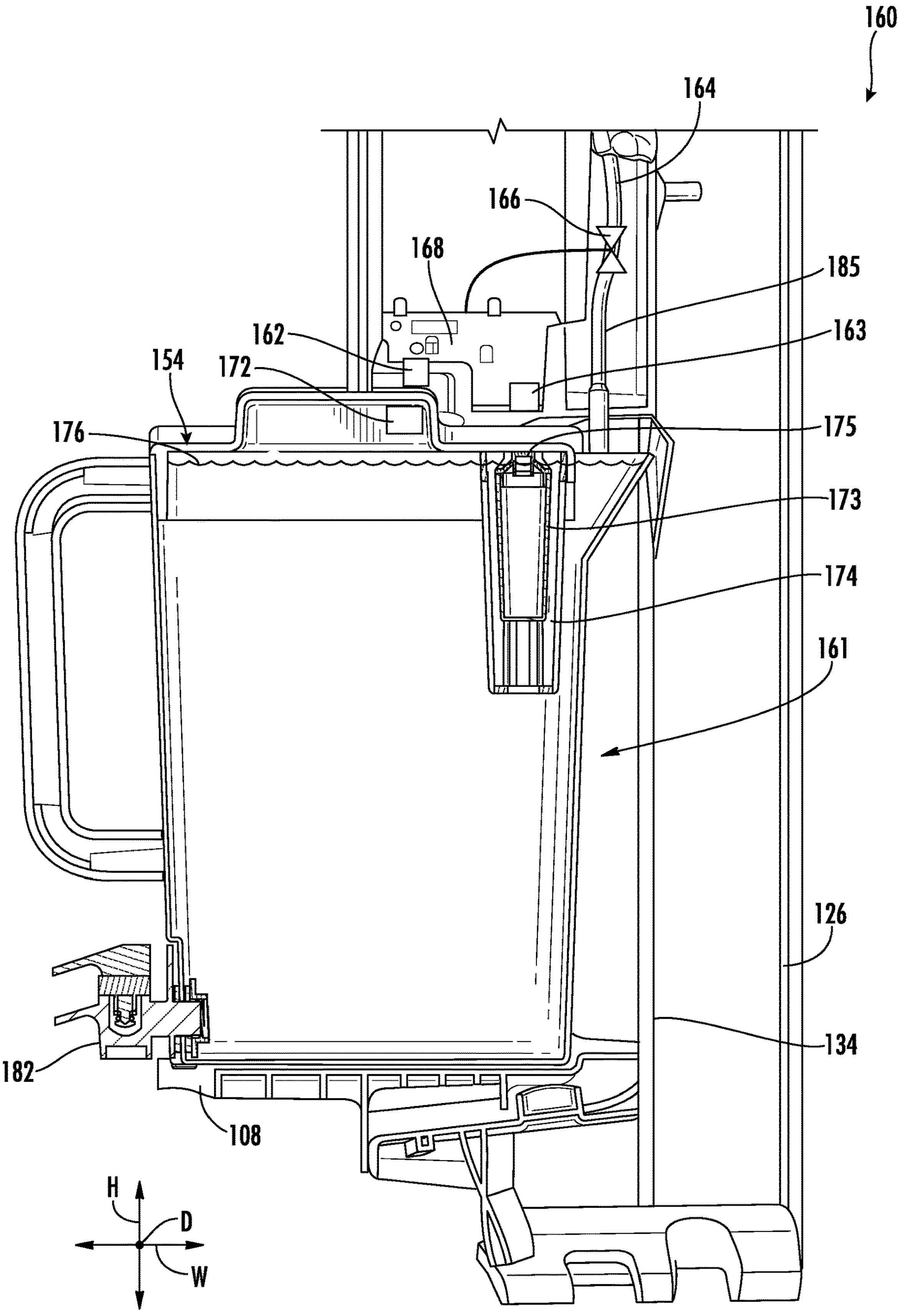
FIG. 5 provides an illustrative view of a pitcher received in a dispenser cavity in accordance with one or more exemplary embodiments of the present disclosure.

FIG. 5 is illustrative of a dispenser 160 that may be used with pitcher 142 in an autofill pitcher system 140. Dispenser 160 defines a cavity 161 to receive pitcher 142 with the H direction generally parallel to the vertical direction V of the refrigerator appliance 100. In the illustrative embodiment shown in the figures, dispenser 160 is positioned on the inner surface 134 of left door 126 of the refrigerator appliance 100. Other embodiments may have the dispenser 160 on door 128 or elsewhere in the fresh food chamber 122.

As illustrated at least in FIG. 5, the cavity 161 comprises a support shelf 108 in direct contact with pitcher bottom wall 146 to support the pitcher 142 in the vertical direction V. When the pitcher 142 is received in the cavity 161 as illustrated in FIG. 5, a portion of the pitcher side wall 144 is adjacent to inner surface 134 of door 126. Inner surface 134 makes inaccessible the portion of the pitcher side wall 144 that is adjacent to it. As illustrated in, for example, FIGS. 2 and 5, the remaining portions of pitcher side wall 144 are exposed when the pitcher 142 is received in the cavity 161. As used herein, walls are exposed when they are readily accessible to a user without moving the pitcher 142. Accessibility may require one or both doors 126, 128 to be in an open position.

Sensor board 168 is vertically above and adjacent to the lid 154 as shown in FIG. 5 when the pitcher 142 is received in dispenser 160. The dispenser 160 may also include a fill tube 164 to direct water from a water supply to pitcher 142 and a valve 166 to selectively control the flow. Components of the dispenser 160 may be in functional communication with controller 200. As such, controller 200 may control the operation of the dispenser 160.

The sensor board 168 includes a first sensor 162 secured to the board to detect the first magnet 172 when the pitcher 142 is properly located in the dispenser 160 to accept a flow of water. The sensor board 168 also includes second sensor 163 positioned such that it is vertically above float body 173 when the pitcher is in the dispenser 160. When the pitcher 142 is in a filled condition as illustrated in FIG. 5, second magnet is proximate to second sensor 163 and may communicate with the second sensor 163, indicating the pitcher 142 is in a filled condition and cannot accept a flow of water.

In the exemplary embodiment illustrated in FIG. 5, the dispenser further includes a fill tube 185 for directing a flow of water into the pitcher 142, e.g., into the internal volume 148 thereof. As illustrated, the fill tube 185 is positioned directly above the spout 152 of the pitcher 142. Thus, in some embodiments, a volume of water may be flowed into the internal volume 148 of the pitcher 142 through the spout 152 when the pitcher 142 is received in the cavity of the dispenser. In other embodiments, the fill tube 185 may be in other locations suitable to allow the flow of fluid (e.g., water) into the pitcher volume 148.

Figure 6:
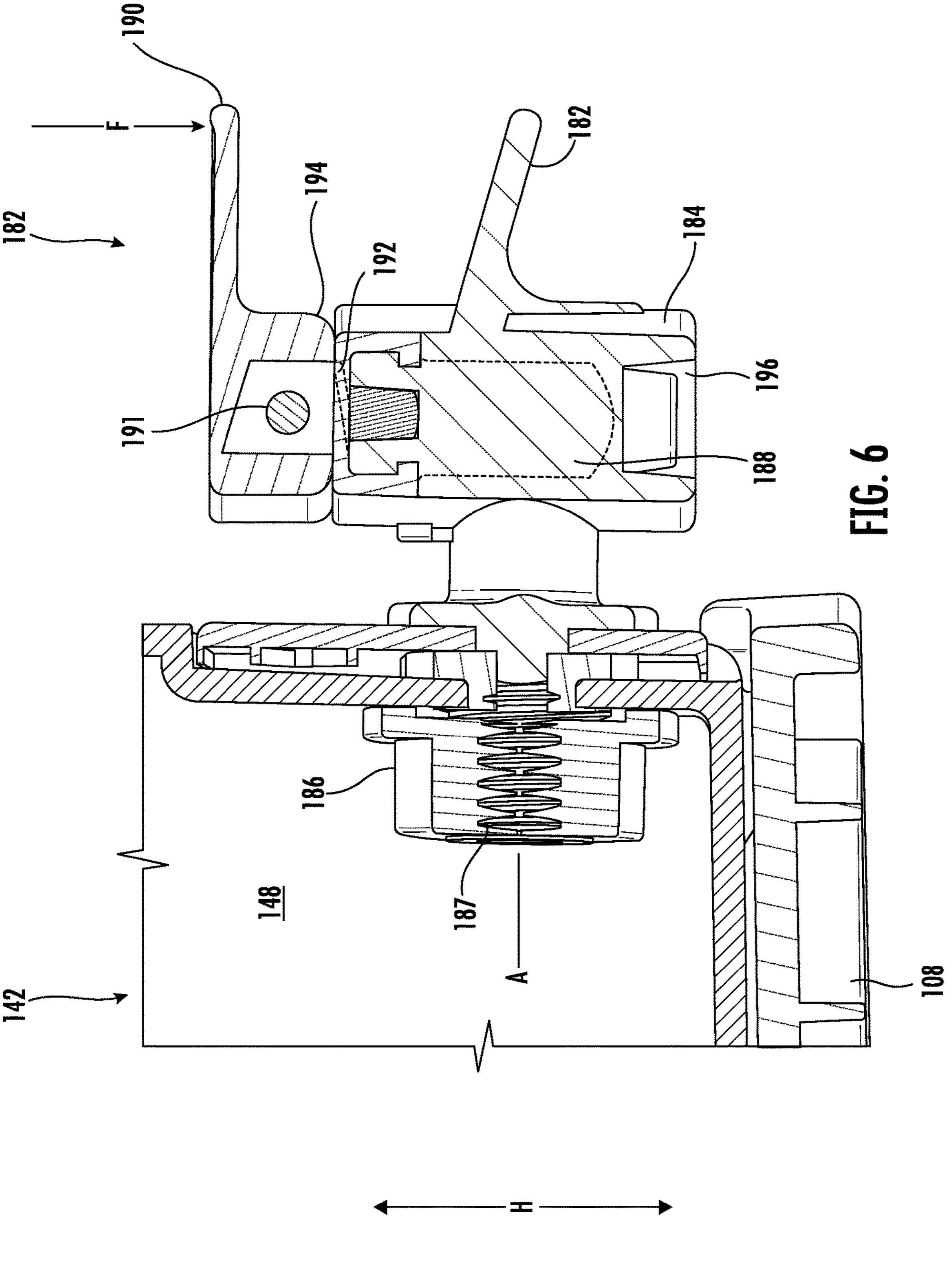
FIG. 6 represents a spigot in accordance with one or more exemplary embodiments of the present disclosure.

As illustrated in FIG. 6 and disclosed above, pitcher 142 includes a spigot 182 positioned on the pitcher side wall 144 and penetrating the pitcher side wall 144 to selectively establish or block fluid communication with the pitcher volume 148. Specifically, spigot 182 may manually selectively allow or block (prevent) fluid communication between the pitcher volume 148 and opening 196 of the spigot 182. In instances where the pitcher volume 148 contains an amount of water (or other liquid), the spigot 182 may manually selectively allow or prevent a flow of water (or other liquid) from the pitcher volume 148 through the spigot 182 and spigot opening 196. In some embodiments, spigot 182 is opposite to the spout 152. Spigot 182 is also located vertically (in the H direction) below the handle 153. Specifically, spigot 182 may be disposed on the pitcher side wall 144 adjacent to, or substantially adjacent to, the pitcher bottom wall 146. When located at a vertically (corresponding with a lower position in the H direction) lower portion of the side wall 144, spigot 182 is positioned to have access to, and drain, all, or substantially all, of the liquid in volume 148 of pitcher 142. Positioned at a lower (in the H direction) portion of the pitcher 142, spigot 182 may be in an area of higher pressure from the height of water vertically (in the H direction) above the spigot. This elevated pressure may encourage the flow of liquid from the pitcher 142 through the spigot 182.

As may be seen for example in FIG. 5, when the pitcher 142 is properly placed within the dispenser 160, spigot 182 is not obstructed and is easily accessible to a user. In the embodiment of FIG. 2, when door 126 is in the open position as illustrated, spigot 182 is freely accessible to dispense water from the pitcher 142.

In the embodiments illustrated in at least FIGS. 3, 4, and 5, spigot 182 does not interfere with the handle 153 or with a user's access to handle 153. Spigot 182 is also clear of the bottom surface of pitcher bottom wall 146, meaning that no part of the spigot 182 extends vertically lower than bottom wall 146. Thus pitcher 142 can be supported at or on pitcher bottom wall 146 without interference from the spigot 182.

As illustrated in at least FIGS. 1 and 5, when pitcher 142 is received in cavity 161, pitcher side wall 144 is in close proximity to other structures of the dispenser 160 or portions of door 126 on at least three sides. For example, inner surface 134 of left door 126 is in close proximity to the spout 152 side of the pitcher 142, making access to that portion of pitcher side wall 144 inaccessible. As illustrated in FIG. 2, shelf 138 is abutting at least a lower portion of pitcher side wall 144 along the width direction W (FIG. 4). Similarly, the opposite portion of side wall 144 abuts a portion of the edge 127 of door 126. Accordingly, in the illustrated embodiment, spigot 182 may be preferably positioned at a lower portion of side wall 144 such that axis A (FIG. 6) of the spigot is generally perpendicular to inner surface 134 of door 126. Accordingly, at least when the door 126 is in a closed position (FIG. 1), axis A is generally parallel to transverse direction T of refrigerator appliance 100.

Alternatively, if pitcher 142 was received in dispenser 160 such that depth direction D was generally perpendicular to the inner surface 134 of door 126, it may be preferable to position the spigot on a portion of side wall 144 such that axis A is perpendicular to inner surface 134 of door 126.

Accordingly, at least when door 126 is in a closed position (FIG. 1), axis A is generally parallel to transverse direction T of refrigerator appliance 100.

In other embodiments, the dispenser 160 is positioned within the cabinet 120, for example in fresh food chamber 122, to receive pitcher 142 in cavity 161. For accessibility and in order to dispense fluid from pitcher 142 without removing the pitcher form the cabinet, spigot 182 may be positioned on side wall 144 such that axis A is generally parallel to the transverse direction T of refrigerator appliance 100.

Spigot 182 may be any type of tap or stopper to manually allow or prevent the flow of liquid from the pitcher volume 148 of pitcher 142. FIG. 6 represents an illustrative spigot 182 in accordance with embodiments of the present disclosure. Spigot 182 includes a body 184 fluidly coupled to the pitcher volume 148 of pitcher 142. In embodiments, the spigot 182 is removably fluidly coupled to the pitcher side wall 144. In the illustrated embodiment, body 184 is mechanically fluidly coupled to the pitcher 142 with a threaded connection 186, for example a bulkhead fitting, that sealingly engages with a portion of the body 184, for example an externally threaded portion 187. Appropriate seals and gaskets (not shown) may be provided to facilitate the creation of a water-tight seal between the spigot 182 and the pitcher 142. Other attachment methods may be used to secure the body 184 to the pitcher 142. For example, body 184 may be chemically or thermally bonded to the pitcher 142 to achieve a water-tight seal.

A plunger 188 may slidingly engage with the body 184 and supported for limited displacement in the H direction. Displacement of plunger 188 in the H direction may be constrained by components of the body 184. Both plunger 188 and the engaging portion of body 184 may have matching tapers to facilitate sealing as illustrated. An upper portion of plunger 188 may be pivotally engaged with lever 190 at pivot 191. Resilient member, spring 192, is contained between lever 190 and plunger 188, biasing the plunger in the downward direction (H direction), sealing the body 184 from pitcher volume 148. A downward force F on lever 190 causes the lever 190 to rotate about fulcrum 194 displacing plunger 188 vertically upward (in the H direction). The vertical displacement moves plunger 188 and body 184 from a sealing engagement and allows contents of the pitcher volume 148 to flow into the body 184 and out through opening 196.

Spigot body 184 may include a projection 198 extending from body 184 vertically below lever 190. Projection 198 may provide a user with a resisting surface when applying downward force F on the lever 190. For example, a user's index finger and thumb may be used to activate the spigot 182. In doing so, the user's index finger may engage the projection 198 and the user's thumb engage the lever 190 to apply force F.

The above description of the spigot 182 is merely illustrative and not limiting. Any other form of spigot or tap may be used, for example a spigot may be rotationally displaced to selectively allow or prevent the flow of liquid from the pitcher 142. Further, in some embodiments the spigot 182 may be omitted.

Figure 7:
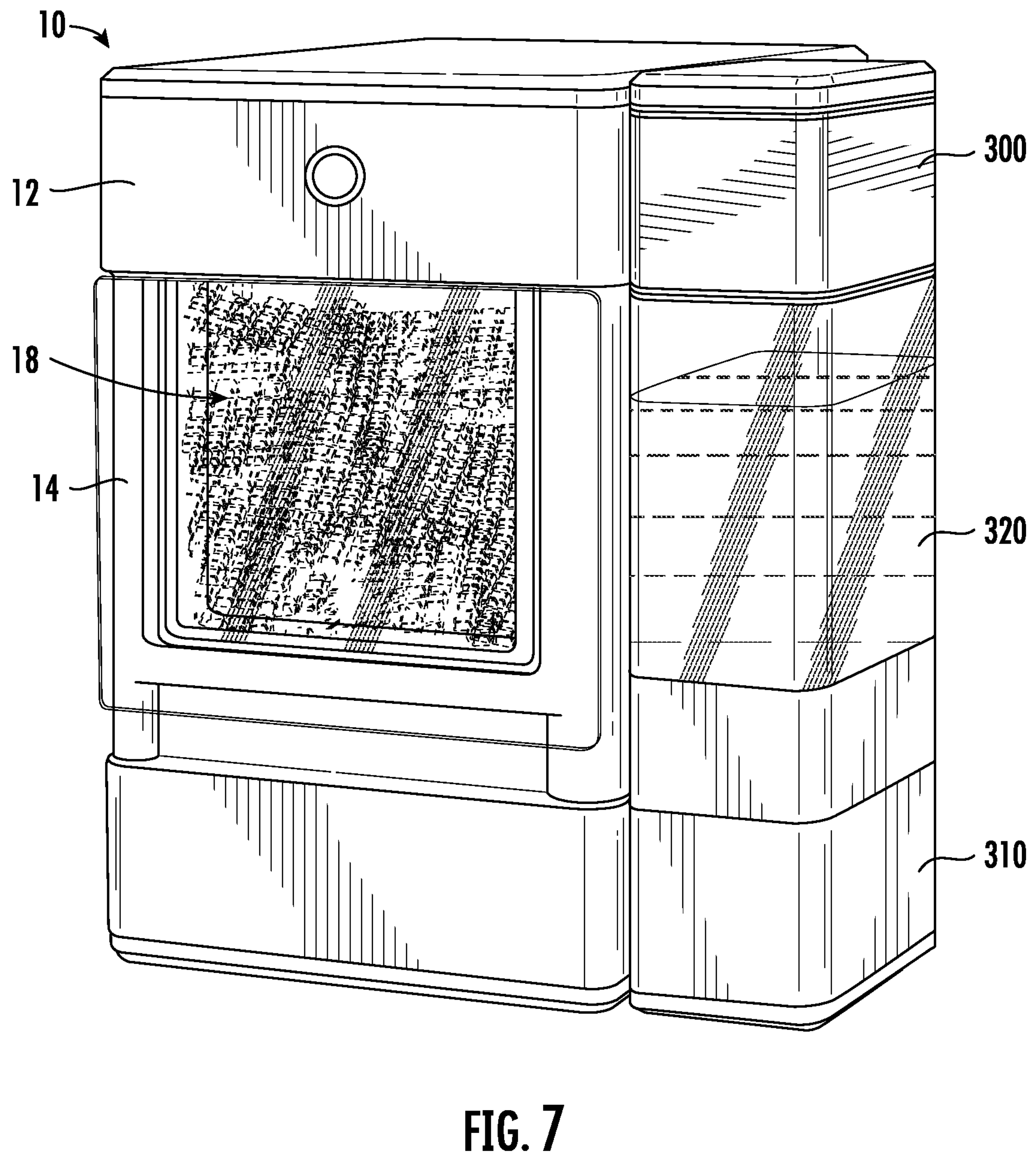
FIG. 7 provides a perspective view of an exemplary countertop appliance according to one or more exemplary embodiments of the present disclosure.
Figure 8:
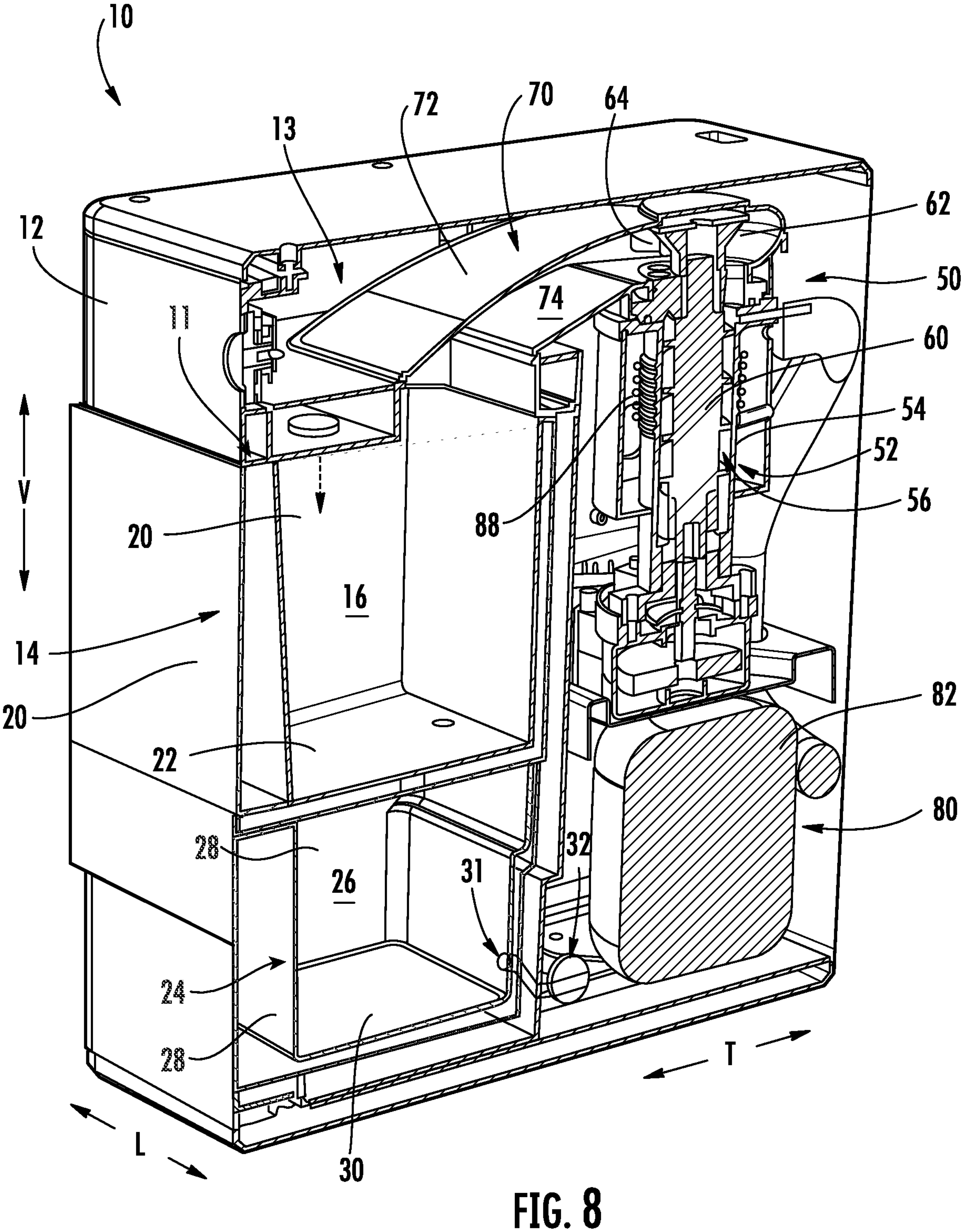
FIG. 8 provides a perspective section view of the example countertop appliance of FIG. 7.
Figure 9:
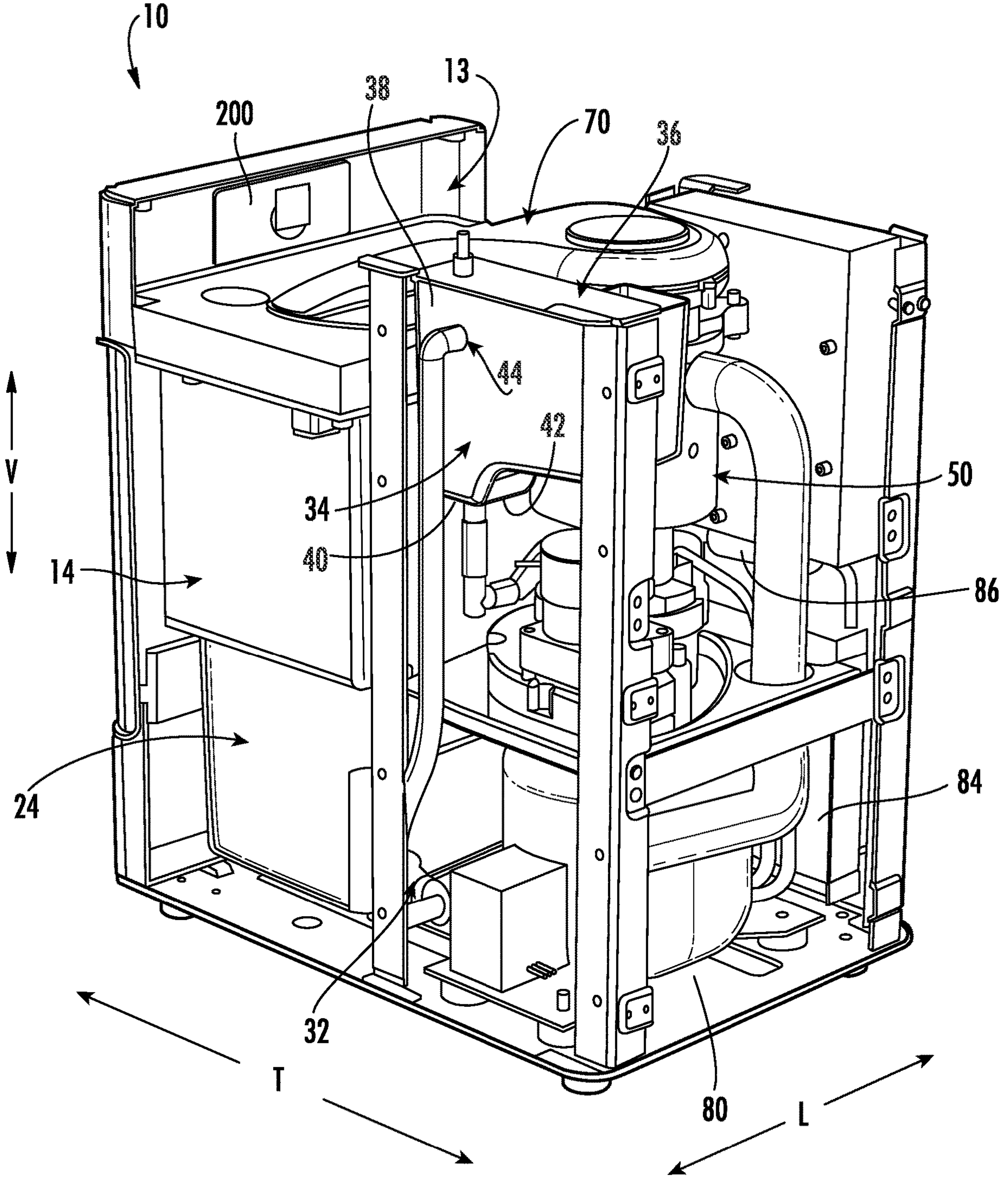
FIG. 9 provides a rear perspective view of the example countertop appliance of FIG. 7 with a casing of the example countertop appliance removed to show interior components of the example countertop appliance.

Referring now to FIGS. 7 through 9, one exemplary non-plumbed water-using appliance, e.g., a countertop appliance 10, that may be used with various systems and methods in accordance with embodiments of the present disclosure is illustrated. As shown, appliance 10 is provided as a stand-alone ice making appliance embodiment. In additional embodiments, systems and methods according to the present disclosure may be used with other countertop appliances as well as or instead of the illustrated exemplary ice making appliance, such as the pitcher 142 may be usable with a coffee maker or other similar countertop appliances. Appliance 10 includes an outer casing 12 which defines a primary opening 11 (e.g., first primary opening) and an internal cavity or volume 13. Internal volume 13 generally at least partially houses various other components of the appliance therein 10. Primary opening 11 defined in outer casing 12 may extend internal volume 13 to an ambient environment. Through primary opening 11, access (e.g., by a user) to the internal volume 13 may be permitted. Outer casing 12 further defines a vertical direction V, a lateral direction L, and a transverse direction T. The vertical direction V, lateral direction L, and transverse direction T are mutually perpendicular and form an orthogonal direction system.

A container 14 of appliance 10 is also illustrated. Container 14 defines a first storage volume 16 for the receipt and storage of ice 18 therein. A user of the appliance 10 may access ice 18 within the container 14 for consumption or other uses, as described in detail below. Container 14 may include multiple walls, including one or more sidewalls 20 and a base wall 22, which may together define the first storage volume 16. In exemplary embodiments, at least one sidewall 20 may be formed in part from a clear, see-through (i.e., transparent or translucent) material, such as a clear glass or plastic, such that a user can see into the first storage volume 16 and thus view ice 18 therein. For instance, at least one sidewall 20 may include a separate external panel and internal panel formed from a clear, see-through (i.e., transparent or translucent) material, such as a clear glass or plastic. Further, in exemplary embodiments, container 14 may be removable, such as from the outer casing 12, by a user. This facilitates advantageous easy access by the user to ice within the container 14, as discussed below.

Appliances 10 in accordance with the present disclosure are advantageously stand-alone appliances, and thus are not connected to refrigerators or other appliances. Additionally, in exemplary embodiments, such appliances are not connected to plumbing or another water source that is external to the appliance 10, such as a refrigerator water source. Rather, in exemplary embodiments, water is initially supplied to the appliance 10 manually by a user, such as by pouring water into water tank 24 and/or an auxiliary reservoir 300. As will be discussed further below, a pitcher, such as the exemplary autofill pitcher 142 described above, may be provided as the auxiliary reservoir 300, or the auxiliary reservoir 300 may include components compatible with (e.g., that are configured to couple with) such pitcher, e.g., a base 310 (described below) of the auxiliary reservoir 300 may be configured to couple with such pitcher.

Notably, countertop appliances 10 as discussed herein include various features which allow the countertop appliances 10 to be affordable and desirable to typical consumers. For example, the stand-alone feature reduces the cost associated with the countertop appliance 10 and allows the consumer to position the countertop appliance 10 at any suitable desired location, with the only requirement in some embodiments being access to an electrical source. In exemplary embodiments, such as those shown in FIGS. 7 through 9, the removable container 14 allows easy access to ice 18 within first storage volume 16 and allows the container 14 to be moved to a different position from the remainder of the appliance 10 for ice usage purposes.

As discussed herein, appliance 10 is configured to make nugget ice, which is becoming increasingly popular with consumers, e.g., ice 18 may be nugget ice. Generally, nugget ice is ice that that is maintained or stored (i.e., in first storage volume 16 of container 14) at a temperature greater than the melting point of water or greater than about thirty-two degrees Fahrenheit. Accordingly, the ambient temperature of the environment surrounding the container 14 may be at a temperature greater than the melting point of water or greater than about thirty-two degrees Fahrenheit. In some embodiments, such temperature may be greater than forty degrees Fahrenheit, greater than fifty degrees Fahrenheit, or greater than sixty degrees Fahrenheit.

Still referring to FIGS. 7 through 9, various components of appliance 10 in accordance with the present disclosure are illustrated. For example, as mentioned, appliance 10 includes a water tank 24. The water tank 24 defines a second storage volume 26 for the receipt and holding of water. Water tank 24 may include multiple walls, including one or more sidewalls 28 and a base wall 30, which may together define the second storage volume 26. In exemplary embodiments, the water tank 24 may be disposed below the container 14 along the vertical direction V defined for the appliance 10, as shown.

As discussed, in exemplary embodiments, water is provided to the water tank 24 for use in forming ice. Accordingly, appliance 10 may further include a pump 32. Pump 32 may be in fluid communication with the second storage volume 26. For example, water may be flowable from the second storage volume 26 through a fluid outlet 31 defined in the water tank 24, such as in a sidewall 28 thereof, and may flow through a conduit to and through pump 32. Pump 32 may, when activated, actively flow water from the second storage volume 26 therethrough and from the pump 32.

Water actively flowed from the pump 32 may be flowed (e.g., through a suitable conduit) to a reservoir 34. For example, reservoir 34 may define a third storage volume 36. In some embodiments, third storage volume 36 is defined by one or more sidewalls 38 and a base wall 40. Third storage volume 36 may, for example, be in fluid communication with the pump 32 and may thus receive water that is actively flowed from the water tank 24, such as through the pump 32. During operation, water may be flowed into the third storage volume 36 through an opening 44 defined in the reservoir 34.

Reservoir 34 and third storage volume 36 thereof may receive and contain water to be provided to an ice maker 50 for the production of ice. Accordingly, third storage volume 36 may be in fluid communication with ice maker 50. For example, water may be flowed, such as through an opening 42 and through suitable conduits, from third storage volume 36 to ice maker 50.

Ice maker 50 generally receives water, such as from reservoir 34, and freezes the water to form ice 18. In exemplary embodiments, ice maker 50 is a nugget ice maker, and in particular is an auger-style ice maker, although other suitable styles of ice makers and/or appliances are within the scope and spirit of the present disclosure. As shown, ice maker 50 may include a casing 52 into which water from third storage volume 36 is flowed. Casing 52 is thus in fluid communication with third storage volume 36. For example, casing 52 may include one or more sidewalls 54 which may define an interior volume 56, and an opening may be defined in a sidewall 54. Water may be flowed from third storage volume 36 through the opening (such as via a suitable conduit) into the interior volume 56.

As illustrated, an auger 60 may be disposed at least partially within the casing 52. During operation, the auger 60 may rotate. Water within the casing 52 may at least partially freeze due to heat exchange, such as with a refrigeration system as discussed herein. The at least partially frozen water may be lifted by the auger 60 from casing 52. Further, in exemplary embodiments, the at least partially frozen water may be directed by auger 60 to and through an extruder 62. The extruder 62 may extrude the at least partially frozen water to form ice, such as nuggets of ice 18.

Formed ice 18 may be provided by the ice maker 50 to container 14, and may be received in the first storage volume 16 thereof. For example, ice 18 formed by auger 60 and/or extruder 62 may be provided to the container 14. In exemplary embodiments, appliance 10 may include a chute 70 for directing ice 18 produced by the ice maker 50 towards the first storage volume 16. For example, as shown, chute 70 is generally positioned above container 14 along the vertical direction V. Thus, ice can slide off of chute 70 and drop into storage volume 16 of container 14. Chute 70 may, as shown, extend between ice maker 50 and container 14, and may include a body 72, which defines a passage 74 therethrough. Ice 18 may be directed from the ice maker 50 (such as from the auger 60 and/or extruder 62) through the passage 74 to the container 14. In some embodiments, for example, a sweep 64, which may be connected to and rotate with the auger, may contact the ice emerging through the extruder 62 from the auger 60 and direct the ice 18 through the passage 74 to the container 14.

As discussed, water within the casing 52 may at least partially freeze due to heat exchange, such as with a refrigeration system. In exemplary embodiments, ice maker 50 may include a sealed refrigeration system 80. The sealed refrigeration system 80 may be in thermal communication with the casing 52 to remove heat from the casing 52 and interior volume 56 thereof, thus facilitating freezing of water therein to form ice. Sealed refrigeration system 80 may, for example, include a compressor 82, a condenser 84, a throttling device 86, and an evaporator 88. Evaporator 88 may, for example, be in thermal communication with the casing 52 in order to remove heat from the interior volume 56 and water therein during operation of sealed system 80. For example, evaporator 88 may at least partially surround the casing 52. In particular, evaporator 88 may be a conduit coiled around and in contact with casing 52, such as the sidewall(s) 54 thereof.

It should additionally be noted that, in exemplary embodiments, a controller 200 may be in operative communication with the sealed system 80, such as with the compressor 82 thereof, and may activate the sealed system 80 as desired or required for ice making purposes.

In exemplary embodiments, controller 200 is in operative communication with the pump 32. Such operative communication may be via a wired or wireless connection, and may facilitate the transmittal and/or receipt of signals by the controller 200 and pump 32. Controller 200 may be configured to activate the pump 32 to actively flow water. For example, controller 200 may activate the pump 32 to actively flow water therethrough when, for example, reservoir 34 requires water. A suitable sensor(s), for example, may be provided in the third storage volume 36. The sensor(s) may be in operative communication with the controller 200 and may be configured to transmit signals to the controller 200, which indicate whether or not additional water is desired in the reservoir 34. When controller 200 receives a signal that water is desired, controller 200 may send a signal to pump 32 to activate pump 32.

Figure 10:
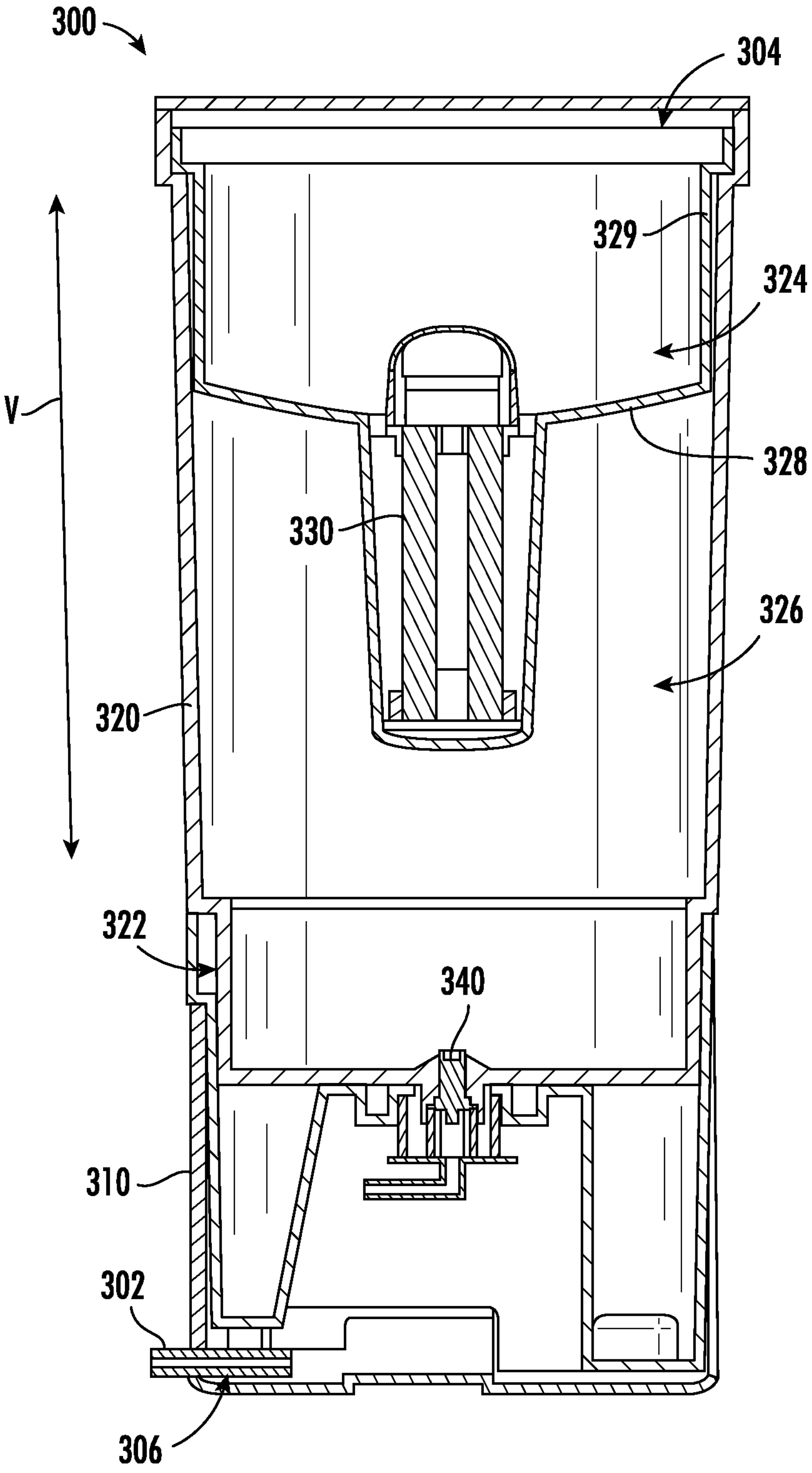
FIG. 10 provides a section view of an auxiliary reservoir for a countertop appliance, such as the example countertop appliance of FIG. 7, according to an example embodiment of the present disclosure.
Figure 11:
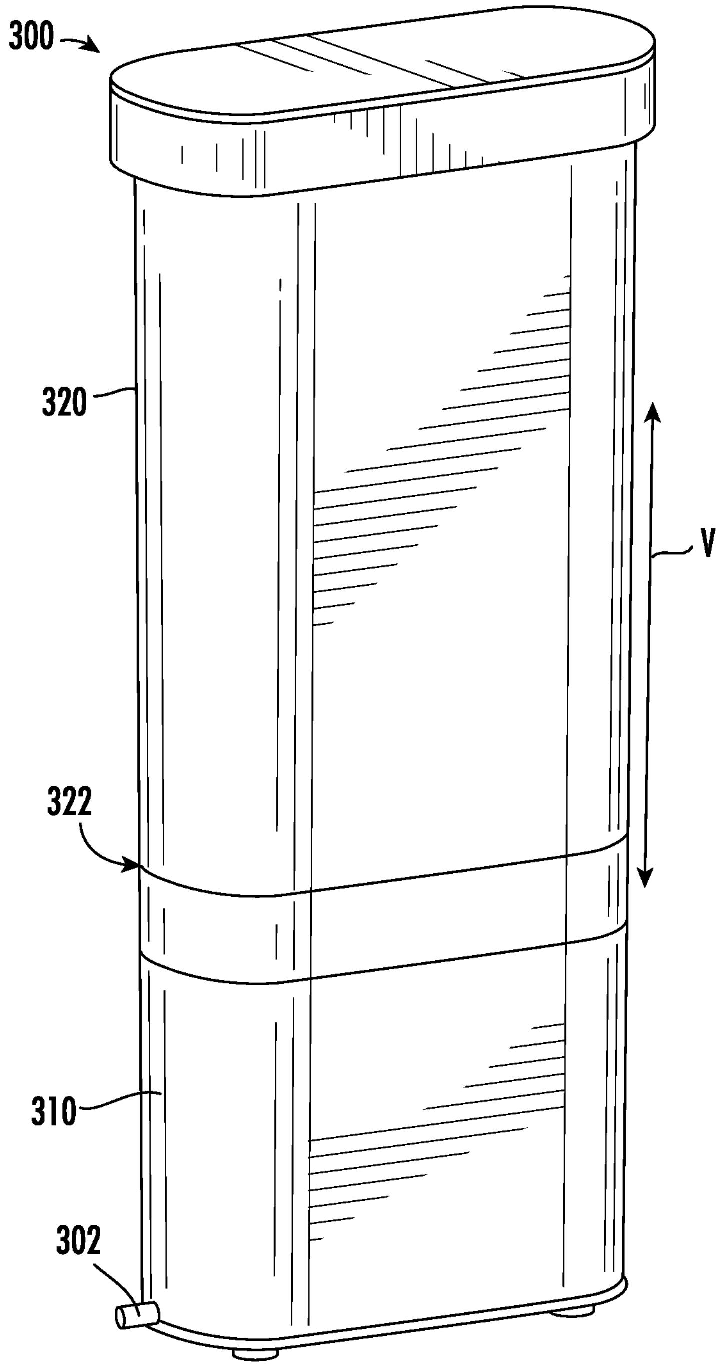
FIG. 11 provides a perspective view of the example auxiliary reservoir if FIG. 10.

As shown in FIG. 7, appliance 10 may also include an auxiliary water reservoir 300. FIGS. 10 and 11 also illustrate auxiliary water reservoir 300 according to another example embodiment. Auxiliary water reservoir 300 is disposed outside of casing 12. For example, auxiliary water reservoir 300 may be mounted at a side of casing 12. Thus, while most components of appliance 10 are housed within casing 12, auxiliary water reservoir 300 is positioned outside of casing 12. In certain example embodiments, auxiliary water reservoir 300 may include a base 310 and a container 320 (as will be discussed further below, container 320 may be pitcher 142 and/or pitcher 142 may be substituted for container 320). Base 310 may be attached to casing 12, e.g., at the side of casing 12 adjacent the bottom of casing 12. For instance, base 310 may be clipped, fastened, etc. to casing 12. Container 320 is removably mounted to base 310. For example, a bottom portion 322 of container 320 may be received within base 310 to mount container 320 on base 310. A user may lift upwardly on container 320 to remove container 320 from base 310, and the user may insert bottom portion 322 of container 320 into base to mount container 320 on base 310. As an example, the user may remove container 320 from base 310 in order to conveniently fill container 320, such as from an autofill dispenser, e.g., dispenser 160 described above.

Auxiliary water reservoir 300 may be in fluid communication with a water tank within casing 12 such that water within auxiliary water reservoir 300 (e.g., in internal volume 148 of pitcher 142) is flowable to the water tank. For example, a supply line 302 may extend from auxiliary water reservoir 300 to water tank 24, and water from within auxiliary water reservoir 300 may flow from auxiliary water reservoir 300 into second storage volume 26 via supply line 302. It will be understood that appliance 10 may be plumbed in any other suitable manner to deliver water from auxiliary water reservoir 300 into casing 12 for use with ice maker 50 in alternative example embodiments.

In some embodiments, auxiliary water reservoir 300 may include features for filtering water prior to the water entering casing 12. By filtering water in auxiliary water reservoir 300, impurities that negatively affect the appearance and/or taste of ice formed by ice maker 50 (or, in another example, coffee brewed in a coffee maker) may be removed from the water. Thus, the appearance and/or taste of the water may be improved.

As shown in FIG. 10, a filter 330 may be disposed within auxiliary water reservoir 300. For instance, auxiliary water reservoir 300 may define an inlet 304 and an outlet 306. Water may be added to auxiliary water reservoir 300 at inlet 304, e.g., from fill tube 185 (FIG. 5) in a dispenser 160, as described above. Water may flow from auxiliary water reservoir 300 at outlet 306. For example, outlet 306 may be coupled to supply line 302, and water from within auxiliary water reservoir 300 may flow from outlet 306 into second storage volume 26 via supply line 302. Filter 330 may be disposed within auxiliary water reservoir 300 between inlet 304 and outlet 306 to filter water within auxiliary water reservoir 300 between inlet 304 and outlet 306.

Filter 330 may be configured such that water within auxiliary water reservoir 300 is gravity fed through filter 330 between inlet 304 and outlet 306 of auxiliary water reservoir 300. For example, container 320 may define a first reservoir volume 324 and a second reservoir volume 326. First reservoir volume 324 may be positioned adjacent or contiguous with inlet 304 of auxiliary water reservoir 300, and second reservoir volume 326 may be disposed below first reservoir volume 324. A divider wall 328 may be disposed between first and second reservoir volumes 324, 326. Thus, e.g., first and second reservoir volumes 324, 326 may be separated by divider wall 328. Filter 330 may be mounted to divider wall 328. Moreover, filter 330 may be disposed between first and second reservoir volumes 324, 326 on divider wall 328. Thus, e.g., divider wall 328 may block water from flowing downwardly from first reservoir volume 324 into second reservoir volume 326 except through filter 330. In particular, unfiltered water (relative to filter 330) may fill first reservoir volume 324, and gravity may urge the water within first reservoir volume 324 into filter 330. Divider wall 328 may be removably mounted within an interior of container 320. For instance, divider wall 328 may form a bottom of a divider insert 329 received within container 320. Divider insert 329 may have a shape that is complementary to container 320, and divider insert 329 may define first reservoir volume 324 therein. Filter 330 may be mounted to divider wall 328 with filter 330 positioned at the only passage through divider wall 328 from first reservoir volume 324 to second reservoir volume 326.

From filter 330, filtered water (relative to filter 330) may exit filter 330 and fill second reservoir volume 326. As may be seen from the above, filter 330 may be disposed between first and second reservoir volumes 324, 326, and filter 330 may filter water flowing from first reservoir volume 324 into second reservoir volume 326 due to gravity urging the water through filter 330. To facilitate the gravity fed flow of water through filter 330, second reservoir volume 326 may be larger than first reservoir volume 324. Such sizing may advantageously reduce the risk of overflowing second reservoir volume 326. Filter 330 may include any suitable filter medium therein, such as one or more of an activated carbon block, a pleated polymer sheet, a spun cord material, or a melt blown material. Filter 330 may be replaced or serviced at regular intervals.

As mentioned above, e.g., in reference to FIGS. 3 and 4, auxiliary water reservoir 300 may include a check valve 340, such as a normally closed check valve. Check valve 340 may be mounted to container 320, e.g., at bottom portion 322 of container 320 (and/or through bottom wall 146, as noted above), at second reservoir volume 326. Check valve 340 may be configured such that check valve 340 is open when container 320 is mounted to base 310. In addition, check valve 340 may be configured such that check valve 340 is closed when container 320 is removed from base 310. When check valve 340 is open, check valve 340 may allow filtered water within second reservoir volume 326, to flow from container 320 into base 310. Within base 310, the filtered water may flow to outlet 306 and thus supply line 302, as described above.

Positioning filter 330 within auxiliary water reservoir 300 may have various advantages. For example, auxiliary water reservoir 300 may be plumbed as branch into a circulation loop within casing 12 formed by container 14, water tank 24, reservoir 34, and ice maker 50. Pump 32 may be operable to circulate water from water tank 24 to reservoir 34 and ice maker 50, and melt water runoff from ice within container 14 may flow back into water tank 24. Positioning a filter in the circulation loop may disadvantageously limit the choice of pump. For example, a diaphragm pump may be required to over come the restriction formed by the filter and flow water from water tank 24 to reservoir 34 and ice maker 50. However, diaphragm pumps may be less reliable and more expensive than other pump types. By positioning filter 330 within auxiliary water reservoir 300, pump 32 may be a centrifugal pump that is more reliable and less expensive than diaphragm pumps. For instance, water within auxiliary water reservoir 300 may be gravity fed through filter 330 in auxiliary water reservoir 300 into a water tank within casing 12, such as water tank 24. Thus, no pump may be required to force water through filter 330. Once in the water tank within casing 12, e.g., water tank 24, the filtered water from filter 330 may be more freely circulated within casing 12, as compared to if filter 330 were installed within casing 12 such that pump 32 actively flows water through filter 330. However, pump 32 may be a diaphragm pump, a gear pump, or another style of pump in alternative example embodiments.

Figure 12:
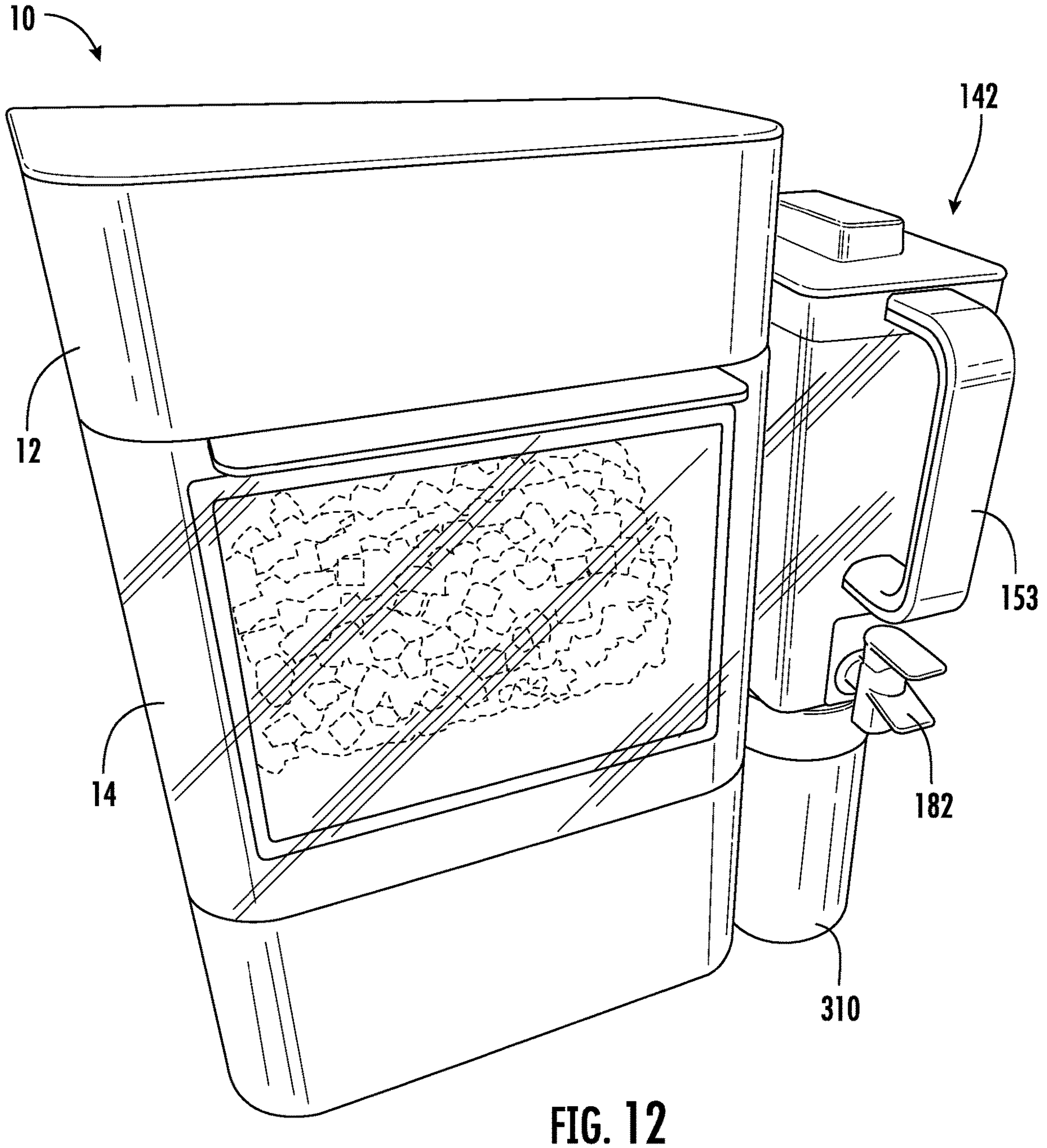
FIG. 12 provides a perspective view of the exemplary countertop appliance of FIG. 7 according to one or more exemplary embodiments of the present disclosure.
Figure 13:
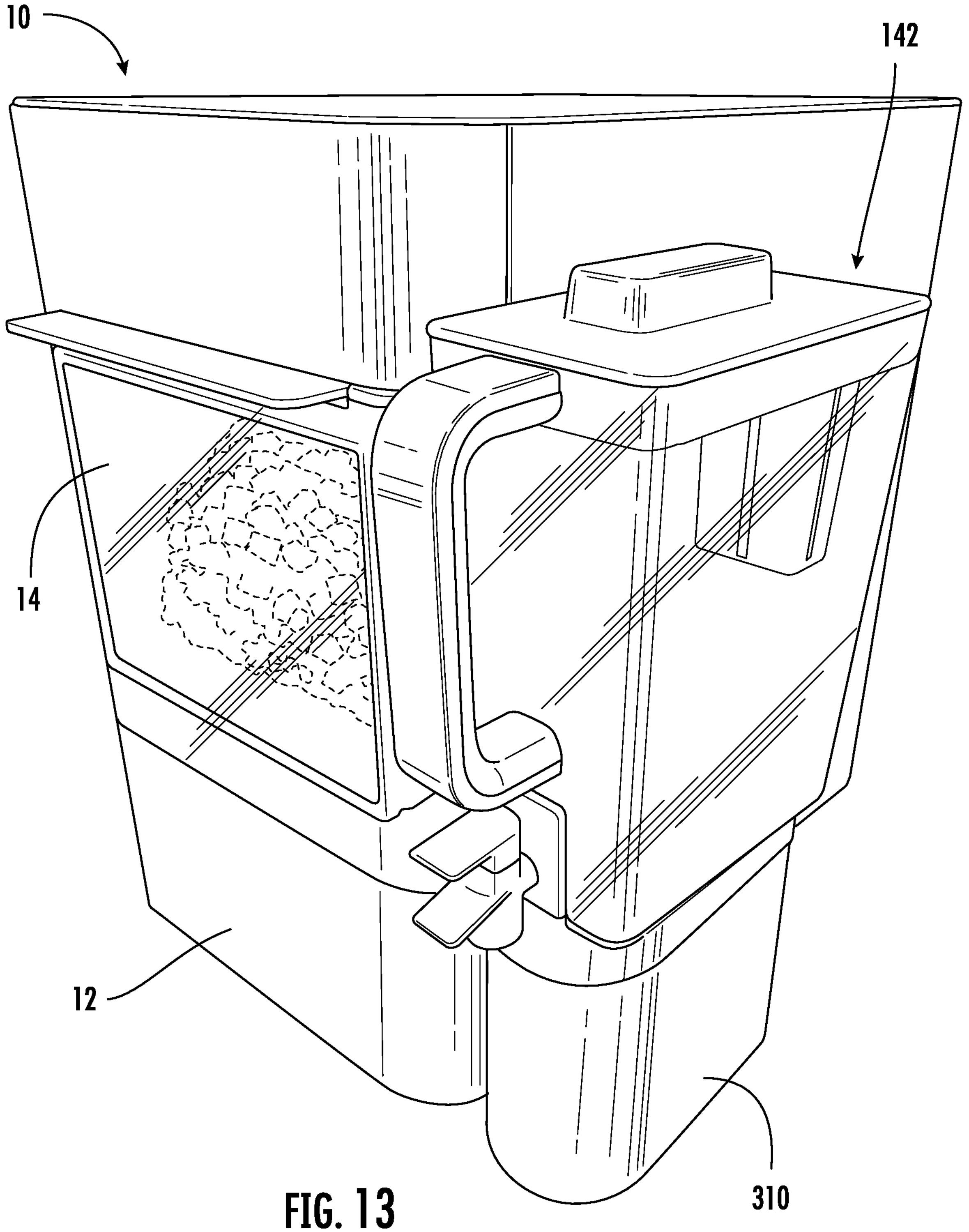
FIG. 13 provides another perspective view of the exemplary countertop appliance of FIG. 12.

Turning now to FIGS. 12 and 13, perspective views are provided of the exemplary countertop appliance 10 (e.g., FIGS. 7-9) with the autofill pitcher 142 (e.g., FIGS. 2-6) coupled thereto. As may be seen throughout the FIGS., the autofill pitcher 142 may take place of the container 320, e.g., the autofill pitcher 142 may include same or similar features for coupling to and providing water to the appliance 10, e.g., via base 310. Thus, for example, the filter 330 and accompanying structures, e.g., divider insert 329, illustrated in FIG. 10 may also or instead be provided in the autofill pitcher 142.

When coupled, e.g., as illustrated in FIGS. 12 and 13, the pitcher 142, e.g., the internal volume 148 thereof, may be in fluid communication with the countertop appliance 10. For example, the pitcher 142 may be configured to provide water from the internal volume 148 of the pitcher 142 to the countertop appliance 10, such as to an internal water tank (e.g., water tank 24) in the countertop appliance 10, when coupled. In some exemplary embodiments, the pitcher 142, e.g., internal volume 148 thereof, may be configured to be in fluid communication with the countertop appliance 10 through the check valve 340 (e.g., FIGS. 3 and 4) when the pitcher 142 is coupled to the appliance 10.

Figure 14:
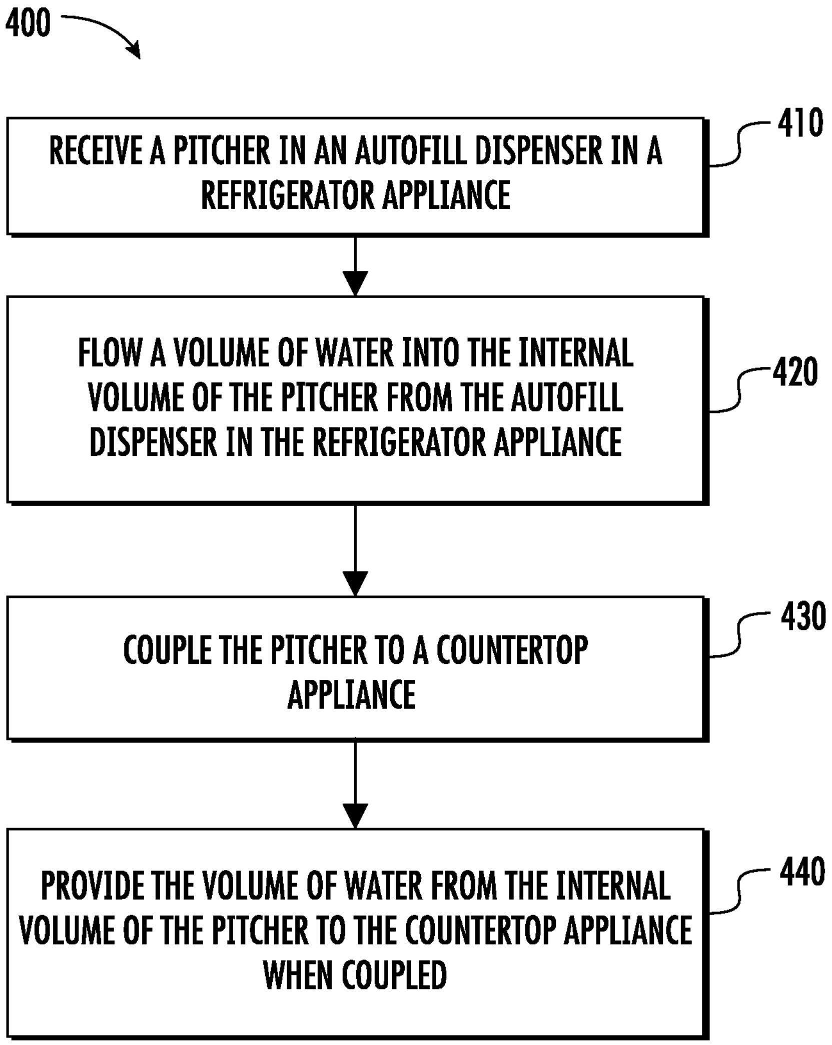
FIG. 14 provides a flow diagram of an exemplary method according to one or more embodiments of the present disclosure.

Turning now to FIG. 14, exemplary embodiments of the present disclosure may also include methods of providing water to a countertop appliance, such as the exemplary method 400 illustrated in FIG. 14. As illustrated in FIG. 14, method 400 may include (410), receiving a pitcher in an autofill dispenser in a refrigerator appliance. The pitcher may include at least one pitcher wall and an internal volume defined within the at least one pitcher wall of the pitcher. The refrigerator appliance may include a cabinet defining a fresh food chamber.

Still referring to FIG. 14, method 400 may also include (420) flowing a volume of water into the internal volume of the pitcher from the autofill dispenser in the refrigerator appliance. For example, the volume of water may be flowed into the internal volume of the pitcher while the pitcher is received in and/or docked with a dispenser, e.g., dispenser 160, in the refrigerator appliance, such as within the fresh food chamber of the refrigerator appliance. For example, when the dispenser is positioned on an internal side or inner side of a door of the refrigerator appliance and the door is in a closed position. Further, the pitcher 142, with the volume of water therein, may be stored in the fresh food chamber for a period of time, such as may thereby provide chilled water within the internal volume of the pitcher.

In some embodiments, the autofill dispenser may define a cavity. In such embodiments, receiving the pitcher in the autofill dispenser may include receiving the pitcher in the cavity. In some embodiments, the at least one pitcher wall may be or may include a bottom wall. In such embodiments, receiving the pitcher in the autofill dispenser in the refrigerator appliance may include receiving the bottom wall of the pitcher on a shelf of the autofill dispenser. For example, the pitcher may include a check valve extending through the bottom wall and downwards from the bottom wall, and the shelf may have a recess defined therein which accommodates the check valve (e.g., the portion thereof which extends downward from the bottom wall) when the bottom wall of the pitcher is received on the shelf.

As may be seen in FIG. 14, method 400 may also include coupling the pitcher to the countertop appliance, e.g., as indicated at (430) in FIG. 14. Such coupling may result in the internal volume of the pitcher being in fluid communication with the countertop appliance. Method 400 may further include (440) providing the volume of water from the internal volume of the pitcher to the countertop appliance when the pitcher is coupled to the countertop appliance.

In some embodiments, the at least one pitcher wall may be or may include a bottom wall, and the pitcher may include a check valve extending downward from the bottom wall away from the internal volume of the pitcher. In such embodiments, coupling the pitcher to the countertop appliance may include coupling the pitcher to the countertop appliance at the check valve of the pitcher, and, as a result of such coupling, the internal volume of the pitcher is in fluid communication with the countertop appliance through the check valve.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of providing water to a countertop appliance, the method comprising:

providing a refrigerator appliance, the refrigerator appliance comprising a cabinet defining a fresh food chamber and an autofill dispenser;

providing the countertop appliance;

providing a pitcher; and receiving the pitcher in the autofill dispenser in the refrigerator appliance, the pitcher comprising at least one pitcher wall, and an internal volume defined within the at least one pitcher wall of the pitcher, and a spout, wherein the at least one pitcher wall comprises a bottom wall, wherein the pitcher comprises a normally-closed check valve extending downward from the bottom wall away from the internal volume of the pitcher, wherein the bottom wall of the pitcher is configured to be received on a shelf of the autofill dispenser, wherein the shelf comprises a recess defined therein which accommodates the normally-closed check valve when the bottom wall of the pitcher is received on the shelf, whereby the normally-closed check valve remains in a closed position while the pitcher is received on the shelf, flowing a volume of water through the spout into the internal volume of the pitcher from the autofill dispenser in the refrigerator appliance;

coupling the pitcher to the countertop appliance, by coupling the pitcher to the countertop appliance at the normally-closed check valve of the pitcher whereby the normally-closed check valve is moved to an open position and the internal volume of the pitcher is in fluid communication with the countertop appliance through the normally-closed check valve in the open position; and providing the volume of water from the internal volume of the pitcher to the countertop appliance through the normally-closed check valve in the open position when coupled.

2. The method of claim 1, wherein the autofill dispenser is positioned on an inner side of a door of the refrigerator, wherein the volume of water is flowed into the internal volume of the pitcher from the autofill dispenser while the door is in a closed position, whereby the pitcher is located in the fresh food chamber of the refrigerator appliance.

3. The method of claim 1, wherein the autofill dispenser defines a cavity, wherein receiving the pitcher in the autofill dispenser comprises receiving the pitcher in the cavity.

4. The method of claim 1, wherein the countertop appliance is an ice making appliance, wherein providing the volume of water from the internal volume of the pitcher to the countertop appliance when coupled comprises providing the volume of water from the internal volume of the pitcher to an internal water tank in the ice making appliance.

5. A system for providing water to a countertop appliance, the system comprising:

a refrigerator appliance, the refrigerator appliance comprising:

a cabinet defining a fresh food chamber; and an autofill dispenser;

the countertop appliance; and a pitcher, the pitcher comprising at least one pitcher wall, an internal volume defined within the at least one wall of the pitcher, and a spout, wherein the pitcher is configured to receive a volume of water into the internal volume of the pitcher from the autofill dispenser in the refrigerator appliance by flowing the volume of water into the internal volume through the spout, wherein the at least one pitcher wall comprises a bottom wall, wherein the pitcher comprises a normally-closed check valve extending downward from the bottom wall away from the internal volume of the pitcher, wherein the pitcher is configured to be received in the autofill dispenser in the refrigerator appliance, wherein the bottom wall of the pitcher is configured to be received on a shelf of the autofill dispenser, wherein the shelf comprises a recess defined therein which accommodates the normally-closed check valve when the bottom wall of the pitcher is received on the shelf, whereby the normally-closed check valve remains in a closed position while the pitcher is received on the shelf, and wherein the pitcher is configured to couple to the countertop appliance, by coupling the pitcher to the countertop appliance at the normally-closed check valve of the pitcher whereby the normally-closed check valve is moved to an open position and the internal volume of the pitcher is in fluid communication with the countertop appliance through the normally-closed check valve in the open position to provide water from the internal volume of the pitcher to the countertop appliance when coupled.

6. The system of claim 5, wherein the autofill dispenser is positioned on an inner side of a door of the refrigerator, whereby the pitcher is located in the fresh food chamber of the refrigerator appliance when the pitcher is received in the autofill dispenser and the door is in a closed position.

7. The system of claim 5, wherein the autofill dispenser defines a cavity, wherein the pitcher is configured to be received in the cavity of the autofill dispenser.

8. The system of claim 5, wherein the countertop appliance is an ice making appliance and wherein the pitcher is configured to couple to the countertop appliance whereby the internal volume of the pitcher is in fluid communication with an internal water tank in the ice making appliance to provide the volume of water from the internal volume of the pitcher to the internal water tank in the ice making appliance.

* * * * *